(12) United States Patent
Lee et al.

(10) Patent No.: US 6,521,491 B2
(45) Date of Patent: Feb. 18, 2003

(54) METHOD FOR FABRICATING THIN FILM TRANSISTOR-LIQUID CRYSTAL DISPLAY

(75) Inventors: Hyung Chan Lee, Kyongsangbuk-do (KR); Youn Bo Lee, Kyonggi-go (KR); Gi Bum Park, Busankwangyeok-shi (KR); Ii Nam Song, Seoul (KR); Beung Hwa Jeong, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/029,388

(22) Filed: Dec. 28, 2001

(65) Prior Publication Data

US 2002/0192883 A1 Dec. 19, 2002

(30) Foreign Application Priority Data

Jun. 13, 2001 (KR) ........................................ 2001-33261

(51) Int. Cl.⁷ ................................................ H01L 21/00
(52) U.S. Cl. ........................ 438/156; 438/30; 438/150; 438/166; 438/149
(58) Field of Search ................................ 438/156, 150, 438/166, 30, 149

(56) References Cited

U.S. PATENT DOCUMENTS 5,362,660 A * 11/1994 Kwasnick et al. ............ 437/40
5,366,912 A * 11/1994 Kobayashi ................... 437/40
5,846,855 A * 12/1998 Igarashi et al. ............. 438/158
6,337,234 B2 * 1/2002 Ha et al. ..................... 438/161
6,376,861 B1 * 4/2002 Yaegashi et al. .............. 257/59

* cited by examiner

Primary Examiner—Vu A. Le
Assistant Examiner—Pho M. Luu
(74) Attorney, Agent, or Firm—Morgan, Lewis & Bockius LLP

(57) ABSTRACT

A method for fabricating an LCD device provided with an active region where a plurality of gate lines are arranged to cross a plurality of data lines so as to define a pixel region, and a cutting region between a pad part of the gate line and a shorting bar, the method includes the steps of forming a gate line including a gate electrode in the active region on a substrate and forming a gate metal pattern for connecting the gate line and the shorting bar in the cutting region, forming an insulating film on an entire surface of the active and cutting regions, forming a TFT provided with source and drain electrodes in the active region, depositing a passivation film on an entire surface of the active region and forming a contact hole at a drain electrode of the TFT and the gate metal pattern, forming a transparent electrode for electrically connecting to the drain electrode through contact hole, selectively etching the transparent electrode so that only a pixel electrode remains in the active region and the gate metal pattern is exposed in the cutting region, and eliminating the gate metal pattern.

10 Claims, 6 Drawing Sheets

METHOD FOR FABRICATING THIN FILM TRANSISTOR-LIQUID CRYSTAL DISPLAY

This application claims the benefit of the Korean Application No. P2001-033261 filed on Jun. 13, 2001, which is hereby incorporated by reference.

BACKGROUND OF THE INVENTION

1. Field of the Invention

The present invention relates to a liquid crystal display (LCD) device, and more particularly, to a method for fabricating thin film transistor-LCD using mixture acid in the same equipment.

2. Discussion of the Related Art

Generally, an LCD panel is divided into an upper substrate, a lower substrate, and an LC layer injected between them.

A plurality of gate lines are arranged to cross a plurality of data lines with a constant interval on the lower transparent substrate to define a plurality of pixel regions of a matrix arrangement. A plurality of TFTs are arranged at a crossing point of the gate lines and the data lines. Also, a plurality of pixel electrodes connected to a drain electrode of the respective TFTs are arranged in the respective pixel regions.

A black matrix layer is formed on the upper substrate to prevent light from being transmitted TFTs, gate lines, and data lines arranged on the lower substrate other than the respective pixel regions. Also, a color filter layer for showing colors at parts corresponding to the respective pixel regions is formed on the upper substrate, and a common electrode is formed on an entire surface.

The upper and lower substrates are attached with constant space to form an LC between the upper and lower substrates.

Polarization plates for linearly polarizing a visible ray are respectively attached to both sides of the upper and lower substrates attached to each other.

Hereinafter, a related art LCD device provided with gate lines and data lines formed on the lower substrate, TFTs, and a pixel electrode will be explained.

FIG. 1 is a lay out of a general LCD device.

As shown in FIG. 1, a plurality of gate lines 101 are formed to cross a plurality of data lines 102 on an insulating substrate. Also, a gate pad 103 and a data pad 104 are respectively formed at end parts of the respective gate lines 101 and the data lines 102. TFTs 105 corresponding to a switching device and a pixel electrode (not shown) are formed in a pixel region defined by crossing the respective gate lines 101 and the data lines 102. Herein, a region consisted of pixel regions of the matrix arrangement becomes an active region where a picture image is realized.

Also, first and second shorting bars 106 and 107 for dividing a plurality of gate lines and data lines into odd and even lines and combining into one are formed at an inner side of an edge of the substrate in the gate pads 103 of the gate lines 101 and the data pads 104 of the data lines 102. The shorting bars 106 and 107 are formed to prevent static electricity generated from the gate and data pads from being applied to the TFTs and thus destroying the TFTs. Also, the shorting bars are used at the time of testing.

Herein, the first shorting bar 106 of the gate line is connected to an odd gate line 101a and an even gate line 101b. the odd gate line 101a is later detached from the first shorting bar 106 by cutting a cutting region 108.

As aforementioned, the first shorting bar 106 is connected to the odd gate line 101a and the even gate line 101b so as to examine an array of TFTs. The odd gate line has to be detached from the first shorting bar after examining the array of TFTs. The detached part is the cutting region.

FIG. 2 is an enlarged plane view of A in FIG. 1 illustrating gate pads, odd and even gate lines concretely.

As shown in FIG. 2, the first and second shorting bars 106 and 107 are formed at vertical directions with the odd and even gate lines 101a and 101b. Herein, the first and second shorting bars 106 and 107 consist of materials which respectively form the gate lines and the data lines.

The odd gate line connected to the first shorting bar 106 has narrow line width between the first and second shorting bars 106 and 107 so as to facilitate cutting from the first shorting bar 106.

FIGS. 3A to 3C are sectional views illustrating a related art method for patterning the pixel electrode of the active region and for a metal pattern process of the cutting region. For reference, the cutting region is a sectional view taken along line I—I' of FIG. 2.

As shown in FIG. 3A, a gate electrode material (AlNd or Al) is deposited on an insulating substrate 301 including an active region and a cutting region, and patterned to form gate lines (not shown, see FIG. 1) including a gate electrode 302. At this time, a gate metal 302a for connecting gate pads of the cutting region and shorting bar are simultaneously formed.

A gate insulating film 303 is deposited on an entire surface of the substrate including the gate electrode 302. Subsequently, a semiconductor layer 304 is formed on the gate insulating film 303 above the gate electrode 302 of the active region. Data lines (not shown, see FIG. 1) are sequentially formed at a vertical direction to the gate lines so that source and drain electrodes 305 and 306 of TFTs are placed on both sides of the semiconductor layer 304.

A passivation film 307 is formed on an entire surface of the substrate of the active region and cutting region including the source and drain electrodes 305 and 306. The passivation film is then selectively eliminated to expose a predetermined part of the drain electrode 306 of TFTs in the active region and to expose the gate metal 302a in the cutting region, thereby forming a contact hole. A transparent electrode 308 of ITO material is then deposited on an entire surface so as to electrically be connected to the drain electrode 306 of TFTs and the gate metal 302a.

As shown in FIG. 3B, a photoresist 309 is deposited on an entire surface, and then patterned by exposure and developing processes so that only pixel region remains in the active region and the gate metal 302a is exposed in the cutting region.

Subsequently, as shown in FIG. 3C, the transparent electrode 308 is selectively eliminated in the active region by using the patterned photoresist 309 as a mask, thereby forming a pixel electrode 308a. Then, the transparent electrode 308 and the gate metal 302a exposed from the patterned photoresist 309 are simultaneously eliminated in the cutting region. At this time, an etchant based on HCL is used for etching to eliminate the transparent electrode 308 and the gate metal 302a at the same time in the cutting region.

Although not shown, the photoresist 309 is eliminated and an alignment film is deposited on an entire surface, thereby completing the lower substrate.

However, the related art method for fabricating the LCD device has the following problems.

FIG. 4 is a structural sectional view illustrating problems according to a related art method for fabricating the LCD device.

That is, as the etchant based on HCL is used for etching to the gate metal and the transparent electrode at the same time in the cutting region, conductive materials in the cutting region is cleanly eliminated. However, as shown in FIG. 4, strong erosion characteristic of the HCL causes crack of the passivation film of TFTs in the active region, and an etchant based on the HCL is penetrated into the crack so that galvanic effect is generated with the gate lines formed of AlNd or Al, thereby causing disconnecting among gate lines.

SUMMARY OF THE INVENTION

Accordingly, the present invention is directed to a method for fabricating thin film transistor-LCD that substantially obviates one or more problems due to limitations and disadvantages of the related art.

An object of the present invention is to provide a method for fabricating thin film transistor-a stable LCD by using two etching etchants in a process and then by eliminating the pixel electrode and the gate metal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for fabricating thin film transistor-LCD device includes, in a method for fabricating an LCD device provided with an active region where a plurality of gate lines are arranged to cross a plurality of data lines so as to define a pixel region, and a cutting region between a pad part of the gate line and a shorting bar, the steps of a first stage of forming gate line including a gate electrode in the active region on a substrate and forming a gate metal pattern for connecting the gate line and the shorting bar in the cutting region; a second stage of forming an insulating film on the entire surface of the active and cutting regions; a third stage of forming a TFT provided with source and drain electrodes in the active region; a fourth stage of depositing a passivation film on the entire surface of the active region and forming a contact hole at a drain electrode of the TFT and the gate metal pattern; a fifth stage of forming a transparent electrode for electrically connecting to the drain electrode through contact hole; a sixth stage of selectively etching the transparent electrode so that only a pixel electrode remains in the active region and the gate metal pattern is exposed in the cutting region; and a seventh stage of eliminating the gate metal pattern.

Herein, it is preferable that the third stage of forming TFTs includes the steps of forming a semiconductor layer on the gate insulating film above the gate electrode; and forming the source and drain electrodes at predetermined parts right and left on the semiconductor layer.

It is preferable that the transparent electrode of the sixth stage is etched using an oxalic acid.

The oxalic acid is preferably 4.5~5 wt %.

The metal pattern of the seventh stage is preferably eliminated using mixture acid including phosphoric acid, nitric acid, and acetic acid.

The mixture acid preferably includes phosphoric acid 60~75%, acetic acid 7~13%, and nitric acid 4~6%.

It is preferable that the mixture acid includes phosphoric acid 67%, nitric acid 5%, and acetic acid 10%.

A stage of eliminating remained oxalic acid on the substrate in a buffer region in the same etching equipment is preferably further included after finishing the sixth stage.

The remained oxalic acid is preferably eliminated by air knife.

The gate lines and gate metal pattern are preferable formed of AlNd or Al.

In the method for fabricating an LCD device according to the present invention, two etching stages of oxalic acid and mixture acid are consecutively performed in a process so the gate metal is seldom influenced, thereby preventing disconnection of gate lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIGS. 5A to 5D illustrate sectional views showing a method for fabricating an LCD device according to the present invention.

Figure 1:
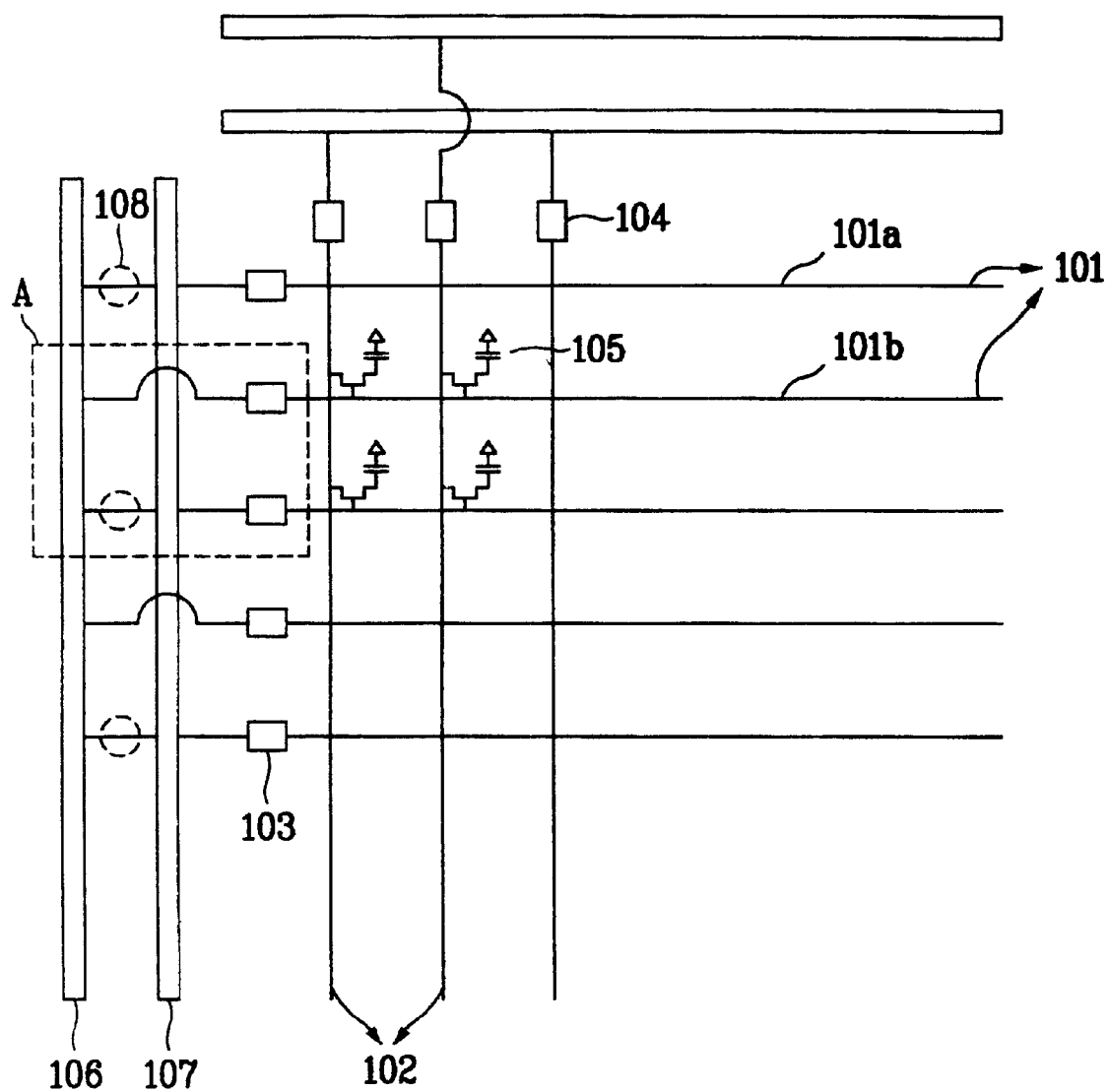
FIG. 1 illustrates a structural plane view of a related art LCD device.
Figure 2:
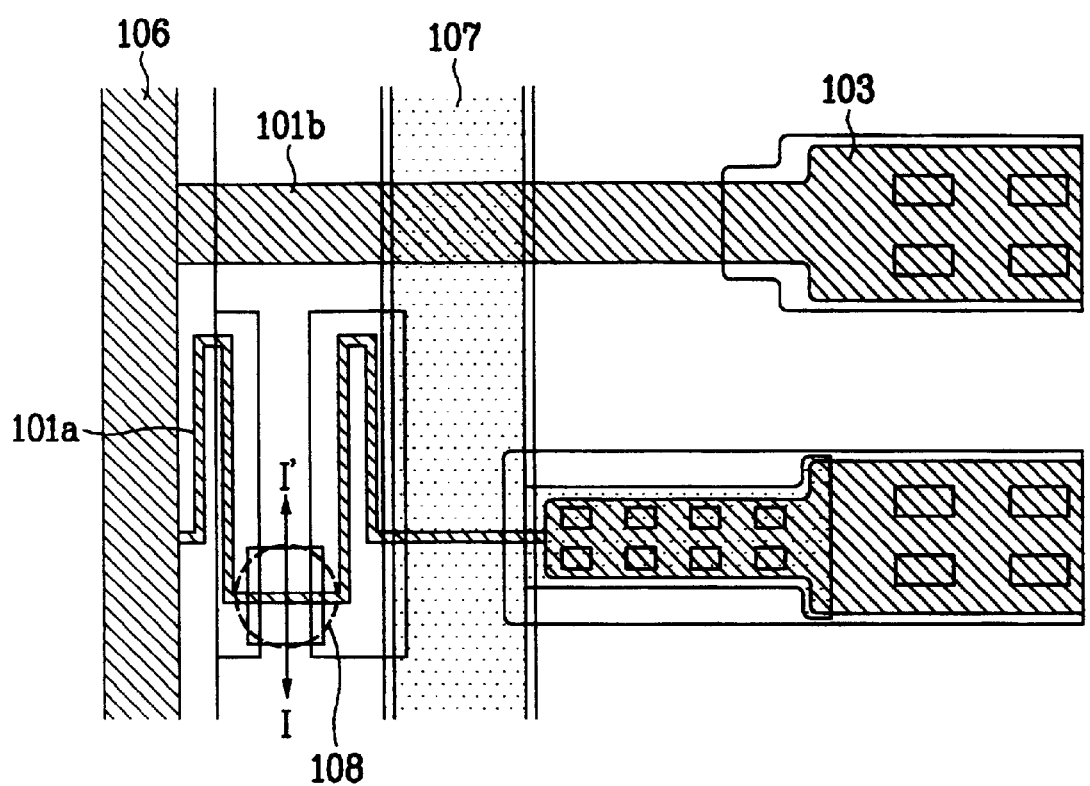
FIG. 2 illustrates an enlarged plane view of A in FIG. 1.
Figure 3A:
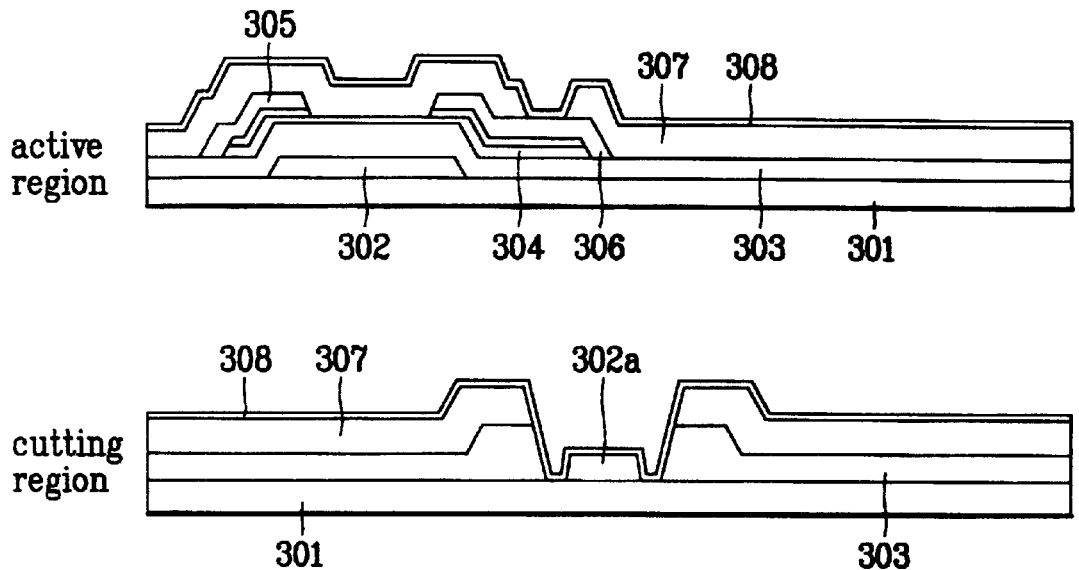
FIGS. 3A to 3C illustrate sectional views of a related art LCD device.
Figure 3B:
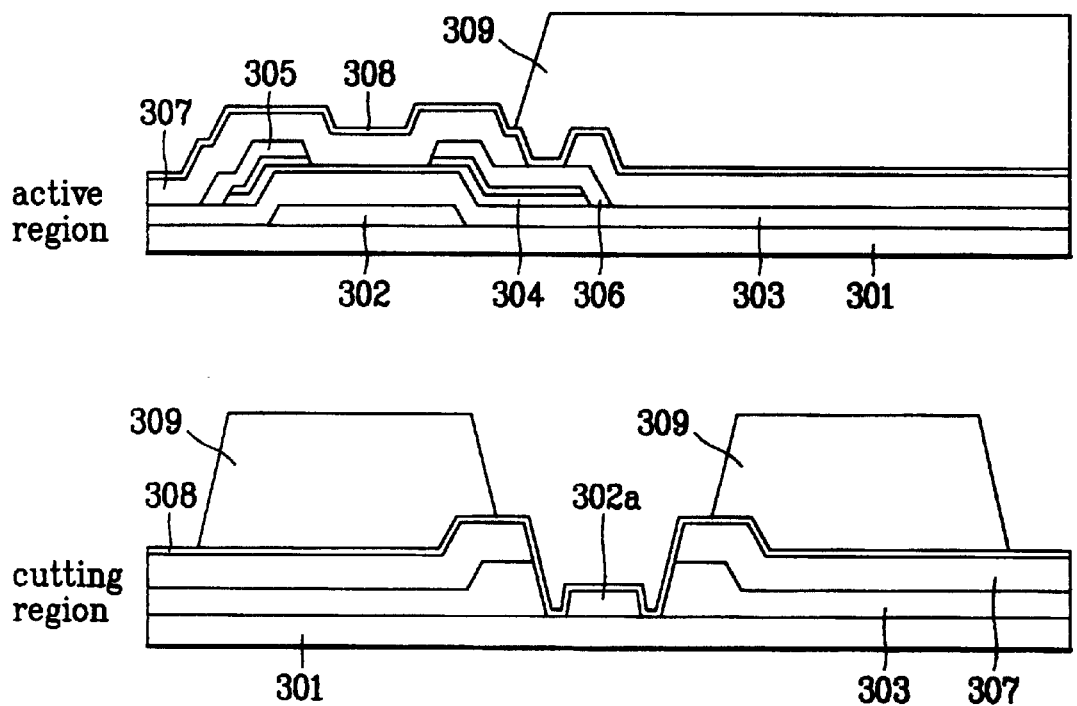
Figure 3C:
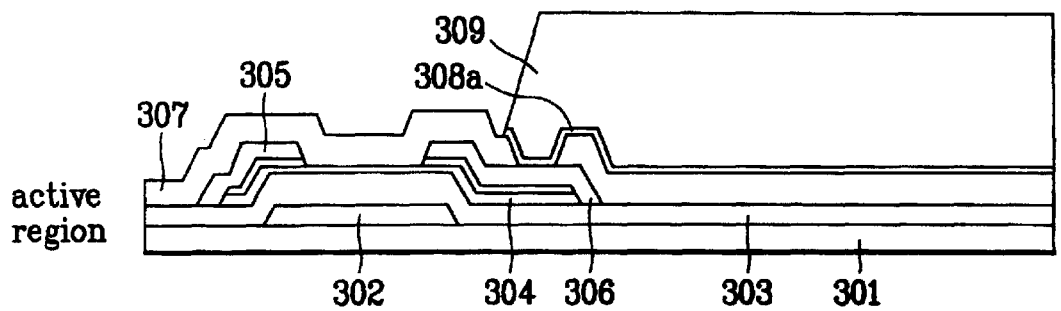
Figure 3C:
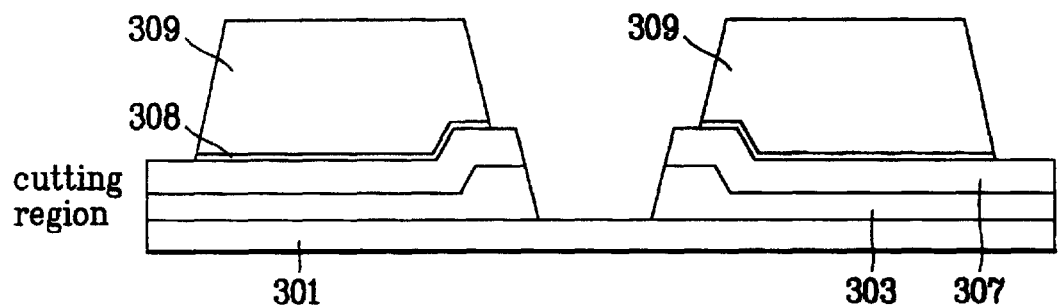
Figure 4:
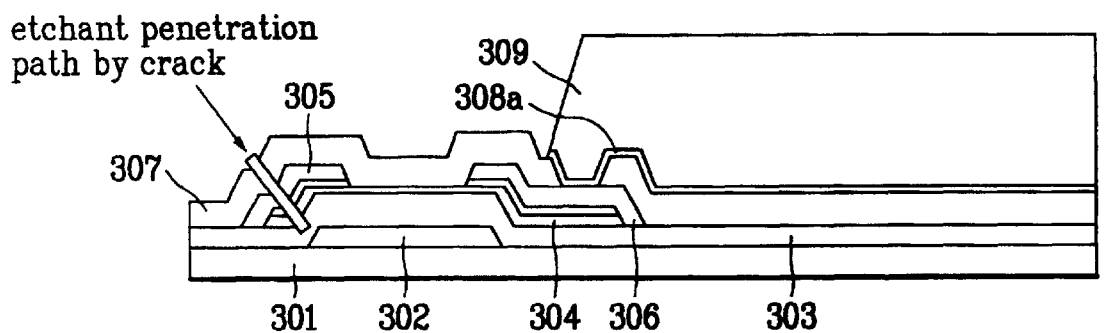
FIG. 4 illustrates a sectional view showing problems of fabricating method for a related art LCD device.
Figure 5A:
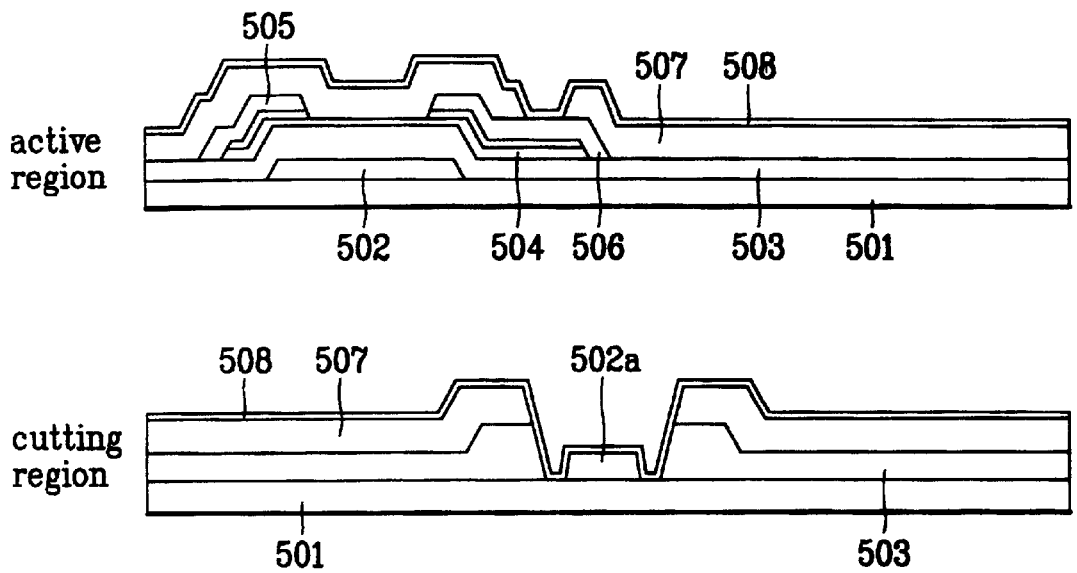
FIGS. 5A to 5D illustrate sectional views showing a method for fabricating an LCD device according to the present invention.

As shown in FIG. 5A, a material to form a gate line (for example, AlNd alloy or Al) is deposited by a sputtering method on an entire surface of an insulating substrate 501 including an active region and a cutting region. Then, the material is patterned by exposure and developing processes so that a gate line (not shown) provided with a gate electrode 502 is formed at the active region, and a gate metal pattern 502a is formed at a cutting region.

Subsequently, a gate insulating film 503 of $SiO_2$ or $SiN_x$ materials is formed on an entire surface including the gate electrode 502 and the gate metal pattern 502a by a chemical vapor deposition method.

A semiconductor layer 504 of a-Si: H material is deposited on an entire surface of the gate insulating film 503 and patterned so as to remain only at an upper portion, thereby forming an activation layer of a TFT.

Subsequently, a conductive material such as Cr or Mo is deposited on an entire surface of the substrate. A data line (not shown) is formed at a vertical direction to the gate line so as to place source and drain electrodes 505 and 506 of the TFT at both sides of the semiconductor layer 504.

A passivation film 507 of an insulating material such as SiNx is formed on an entire surface of the active region and the cutting region. Then, the passivation 507 and the gate insulating film 503 are selectively eliminated so as to expose a predetermined part of the drain electrode of the TFT in the active region, and to expose the gate metal pattern 502a in the cutting region, thereby forming a contact hole.

A transparent electrode 508 is deposited on the passivation film 507 of the active region and the cutting region so as to electrically be connected to the drain electrode 506 of the TFT and the gate metal pattern 502a through the contact hole.

Figure 5B:
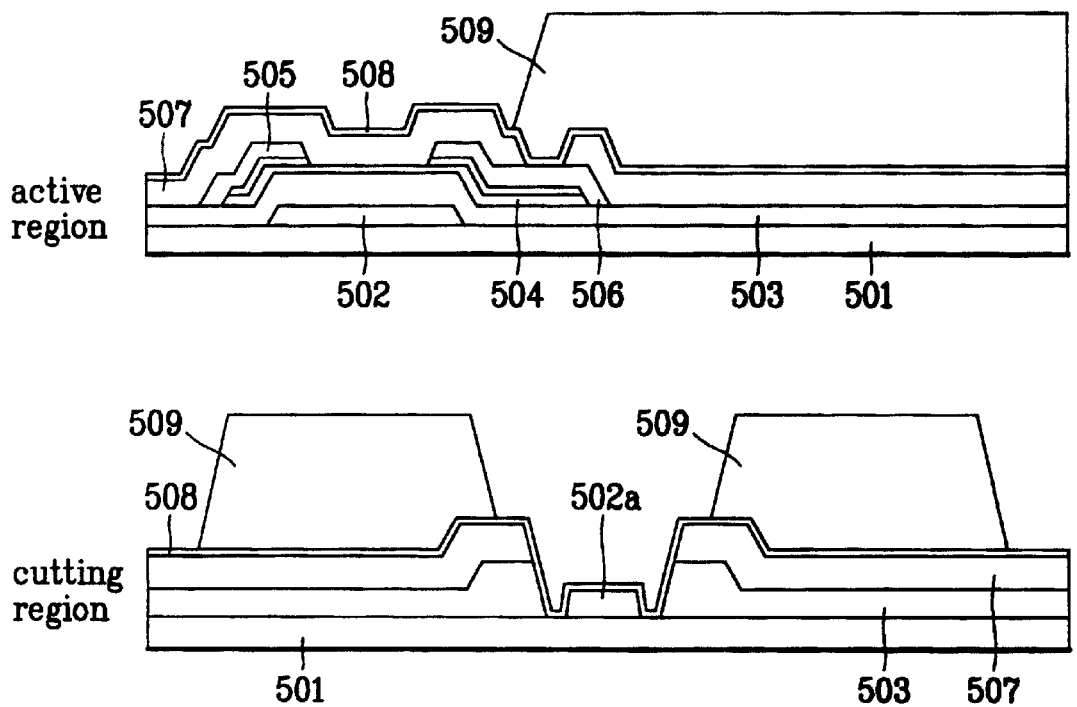

As shown in FIG. 5B, a photoresist 509 is deposited on an entire surface of the active region and the cutting region of pad unit to pattern the regions. Then, the photoresist 509 is patterned by exposure and developing processes so that only the pixel region remains at the active region and the gate metal pattern 502a is exposed in the cutting region. That is, regions corresponding to the TFT, the gate line, and the data line are exposed in the active region, and a region where the gate metal pattern 502a is formed is exposed in the cutting region.

Figure 5C:
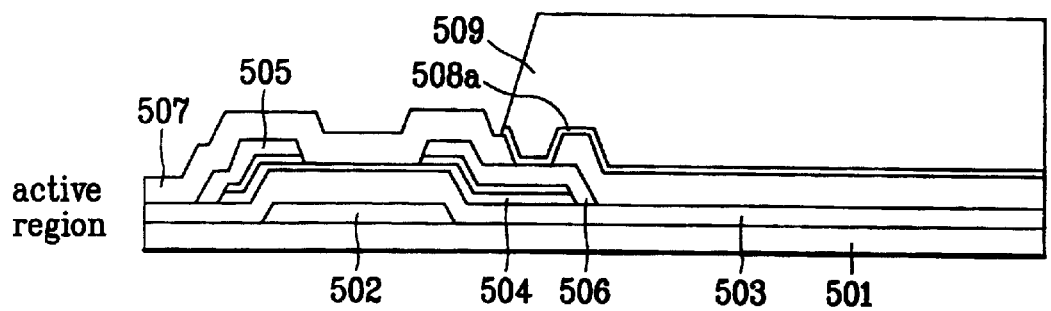
Figure 5C:
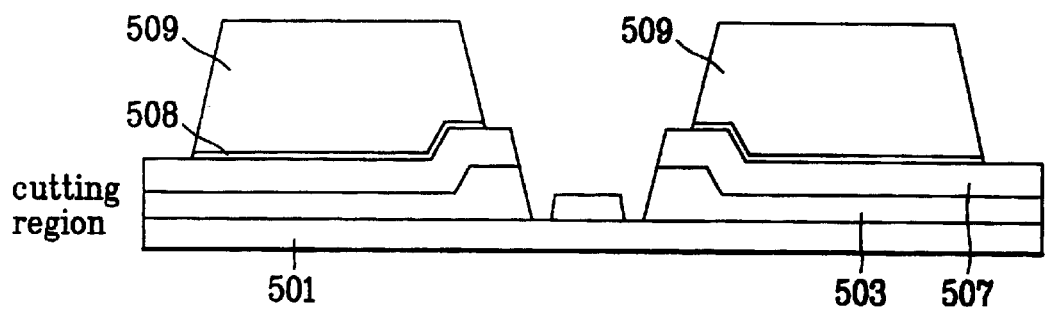

Subsequently, as shown in FIG. 5C, a common electrode 508 exposed in the active region and the cutting region is selectively etched by oxalic acid, thereby forming a pixel electrode 508a in the pixel region. Herein, the oxalic acid is used at a range of 4.5~5wt %, and the oxalic acid does not influence to a metal based on Al for a constant time.

Then, remainder of the oxalic acid used to pattern the pixel electrode 508a is eliminated in a buffer region of the same equipment by an air knife.

Figure 5D:
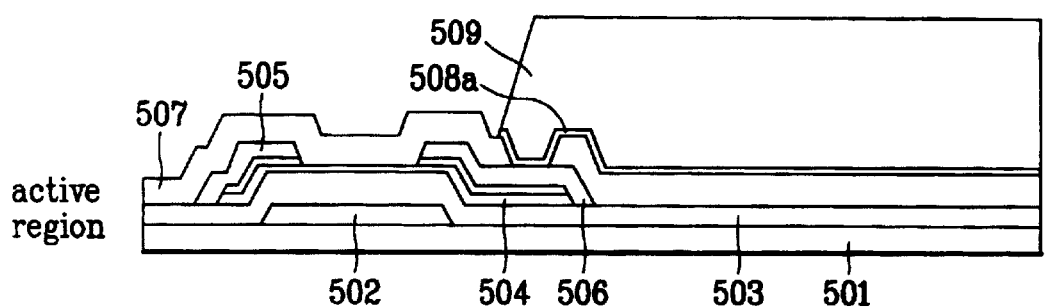
Figure 5D:
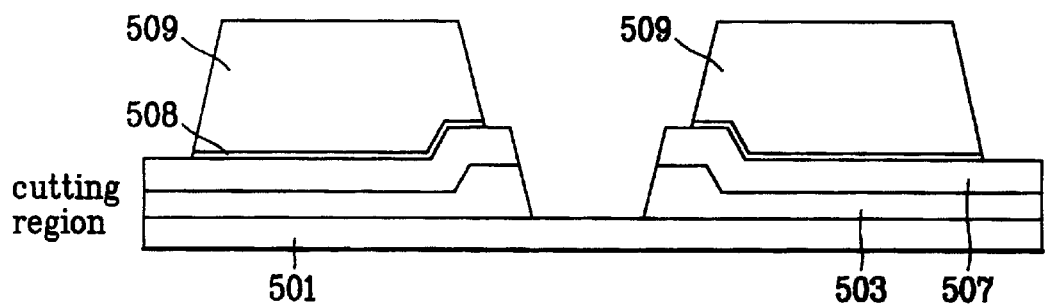

As shown in FIG. 5D, the gate metal pattern 502a in the cutting region is etched using mixture acid including phosphoric acid, nitric acid, and acetic acid under a state that the remainder of the oxalic acid on the substrate is eliminated. At this time, the photoresist 509 is still maintained. The mixture acid does not influence to the pixel electrode. Also, an ideal ratio of the mixture acid includes phosphoric acid 60~75% (preferably 67%), acetic acid 7~13% (preferably 10%), nitric acid 4~6% (preferably 5%), and another additive. The mixture acid has an advantage that permeability characteristic is low and galvanic effect is not generated with a gate metal based on Al even if etching speed is low compared with an etchant based on HCL. Accordingly, disconnection of a gate electrode or a gate line is not generated even if there is crack or different material in a TFT.

FIGS. 5A to 5D are applied to the same equipment uniformly.

A method for fabricating an LCD device according to the present invention as aforementioned has the following advantages.

That is, the oxalic acid and the mixture acid used in the present invention have low permeability characteristic to the gate metal compared with an etchant based on HCL, thereby reducing inferiority occurrence. And, galvanic effect is not generated even if different material exists between the pixel electrode and the gate metal, thereby decreasing loss of the pixel electrode pattern.

Also, whole processes can be performed in the same equipment to increase productivity. Additionally, waste liquid and wastewater harmful to human body and environment at work are decreased, and erosion of installation can be lowered.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for fabricating an LCD device provided with an active region where a plurality of gate lines are arranged to cross a plurality of data lines to define a pixel region, and a cutting region between a pad part of the gate line and a shorting bar, the method comprising the steps of:

(a) forming a gate line including a gate electrode in the active region on a substrate and forming a gate metal pattern for connecting the gate line and the shorting bar in the cutting region;

(b) forming an insulating film on an entire surface of the active and cutting regions;

(c) forming a TFT provided with source and drain electrodes in the active region;

(d) depositing a passivation film on an entire surface of the active region and forming a contact hole at a drain electrode of the TFT and the gate metal pattern;

(e) forming a transparent electrode for electrically connecting to the drain electrode through contact hole;

(f) selectively etching the transparent electrode so that only a pixel electrode remains in the active region and the gate metal pattern is exposed in the cutting region; and (g) eliminating the gate metal pattern.

2. The method as claimed in claim 1, wherein the step of forming the TFT includes the steps of:

forming a semiconductor layer on the gate insulating film above the gate electrode; and forming the source and drain electrodes at predetermined parts left and right on the semiconductor layer.

3. The method as claimed in claim 1, wherein the transparent electrode of (f) is etched using oxalic acid.

4. The method as claimed in claim 3, wherein the oxalic acid is used at a range of 4.5~5wt %.

5. The method as claimed in claim 1, wherein the gate metal pattern of (g) is eliminated using mixture acid including phosphoric acid, nitric acid, and acetic acid.

6. The method as claimed in claim 5, wherein the mixture acid includes phosphoric acid 60~75%, acetic acid 7~3%, nitric acid 4~6%.

7. The method as claimed in claim 5, wherein the mixture acid includes phosphoric acid 67%, acetic acid 10%, nitric acid 5%.

8. The method as claimed in claim 1, further comprising the step of eliminating remained oxalic acid on a substrate in a buffer region of the same etching equipment.

9. The method as claimed in claim 8, wherein the remained oxalic acid is eliminated by an air knife.

10. The method as claimed in claim 1, wherein the gate line and the gate metal pattern are formed with AlNd or Al.

* * * * *